United States Patent
Weisse

[11] 3,892,699
[45] July 1, 1975

[54] PROCESS FOR INHIBITING MICROBIAL GROWTH IN WATER-BASED PAINTS

[75] Inventor: Guenter K. Weisse, Northford, Conn.

[73] Assignee: Olin Corporation, New Haven, Conn.

[22] Filed: July 31, 1972

[21] Appl. No.: 276,865

Related U.S. Application Data

[63] Continuation-in-part of Ser. No. 73,240, Sept. 17, 1970, abandoned, which is a continuation-in-part of Ser. No. 792,756, Jan. 21, 1969, abandoned.

[52] U.S. Cl............ 260/29.6 MM; 106/15 AF; 260/29.6 MN; 260/29.7 M; 260/45.75 R; 260/45.75 K
[51] Int. Cl............. C09d 5/14; C08f 45/64
[58] Field of Search.......... 260/29.6 MM, 29.6 MN, 29.7 M; 106/15 AF

[56] References Cited
UNITED STATES PATENTS

| | | | |
|---|---|---|---|
| 3,235,455 | 2/1966 | Judge et al. | 424/232 |
| 3,281,366 | 10/1966 | Judge et al. | 252/107 |
| 3,282,877 | 11/1966 | Lowes | 260/29.6 MM |
| 3,325,436 | 6/1967 | Prindle et al. | 260/29.7 M |
| 3,817,760 | 6/1974 | Brake | 260/29.6 MN X |
| 3,817,761 | 6/1974 | Brake | 260/29.6 MN X |
| 3,817,762 | 6/1974 | Brake | 260/29.6 MN X |

*Primary Examiner*—Lucille M. Phynes
*Attorney, Agent, or Firm*—Robert L. Andersen; Eugene Zagarella, Jr.

[57] ABSTRACT

Water-based paints are inhibited against microbial growth by the addition of a biocidal composition comprising a mixture of a selected metal salt of 2-mercaptopyridine-1-oxide and a selected bromosalicylanilide compound.

7 Claims, No Drawings

PROCESS FOR INHIBITING MICROBIAL GROWTH IN WATER-BASED PAINTS

This application is a continuation-in-part of copending U.S. application Ser. No. 73,240 filed Sept. 17, 1970 and now abandoned which in turn is a continuation-in-part of U.S. application Ser. No. 792,756, filed Jan. 21, 1969 and now abandoned.

This invention relates to a process for inhibiting microbial growth in water-based paints and to inhibited compositions produced thereby. More particularly, this invention relates to the use of mixtures of selected 2-mercaptopyridine-1-oxide salts and selected bromosalicylanilides as preservatives for water-based paints.

The need for preservatives for water-based paints is well known, since microbial contamination results in separation, settling, putrefaction, viscosity loss and other detrimental physical and chemical changes in these compositions. This contamination has several sources, such as the environment and the use of unclean paint application equipment. For example, it is likely that repeated exposure to air results in reinoculation with more bacteria and mold. Thus, it is particularly important that water-based paints have an effective can stability, since storage accentuates the risk of spoilage from bacterial and mold contamination. While there are many available biocides which are employed as preservatives, not all biocides are effective when used in paints. The reason for this is because the preservative, besides providing the necessary biocidal activity against microbial contamination, must also not adversely affect the numerous physical and chemical properties of the paint. Thus besides being compatible with the paint such properties and characteristics of the paint as color, gloss, viscosity, vapor pressure, odor etc. must be satisfied after the preservative is added. In many cases, preservatives which have the desired biocidal activity, have been found to be unsatisfactory because they adversely affected one or more properties of the paint. In addition to the above-noted properties, the selected biocidal composition must also have a low mammalian toxicity.

The metal salts of 2-mercaptopyridine-1-oxide and the bromosalicylanilides are known to have some antibacterial and antifungal properties and mixtures of 2-mercaptopyridine-1-oxide salts and halogenated salicylanilides have been disclosed in U.S. Pat. No. 3,235,455 to have antibacterial properties when admixed and incorporated into a soap or detergent product. However the combination of a metal salt of 2-mercaptopyridine-1-oxide and the brominated salicylanilides has not previously been known to be effective as a biocidal mixture in water-based paint compositions. In fact, the low water solubility of such materials plus the fact that similar mixtures have proven to be ineffective in other aqueous mediums, as noted in Comparative Example 1, would suggest that such mixtures would not be effective in water-based paint compositions.

Now it has been found in accordance with this invention that selected mixtures of certain 2-mercaptopyridine-1-oxides and bromosalicylanilides are highly effective in inhibiting microbial growth in water-based paint compositions. It is significant to note that the paint composition containing such mixture satisfies all the chemical and physical property requirements of paints. The effectiveness of these compositions when incorporated in the aforementioned media is particularly surprising and unexpected in view of the fact that the same compositions have been found to be ineffective biocides for other aqueous systems such as starch pastes and further in view of the low water solubility of the individual components.

More specifically, the biocidal composition employed according to the invention comprises a mixture consisting of from about 1:1 to about 1:8 parts by weight of 2-mercaptopyridine-1-oxide salt to bromosalicylanilides and preferably from about 1:2 to about 1:4.

2-Mercaptopyridine-1-oxide has the following structural formula in tautomeric form:

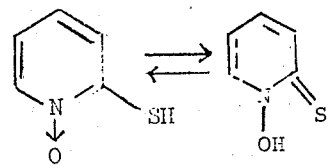

The various metal salts and chelates thereof are prepared by reacting the appropriate metal salt with 2-mercaptopyridine-1-oxide. (U.S. Pat. No. 2,809,971 discloses such type compounds.)

While a wide variety of 2-mercaptopyridine-1-oxide salts may be employed in the practice of this invention, the zinc, zirconium and tin metal salts are preferred with the zinc salt being most preferred.

A wide variety of bromosalicyclanilides can be employed in the composition of this invention including, for example, 3,4,4'-tribromosalicylanilide, 3,4',5-tribromosalicylanilide, 4',5-dibromosalicylanilide, 5-bromosalicylanilide, 3,5-dibromosalicylanilide, 2',5-dibromosalicylanilide, 2',3,4',5-tetrabromosalicylanilide, 2',3,5-tribromosalicylanilide, 3',4',5-tribromosalicylanilide, 4',4',5-tribromosalicylanilide, 3,3',4',5-tetrabromosalicylanilide, 2',3,4',5,5'- and 2',3,4',5,6'-pentabromosalicylanilide and mixtures thereof. Particularly preferred is 3,4',5-tribromosalicylanilide and 4',5-dibromosalicylanilide and mixtures thereof. A particularly preferred mixture called Temasept and produced by Fine Organics, Inc. contains 51.0 percent 3,4-',5-tribromosalicylanilide, 45.0 percent, 4',5-dibromosalicylanilide, 1.5 percent 3,5-dibromosalicylanilide, 2.0 percent 5-monobromosalicylanilide and 0.5 percent 2',3,4',5-tetrabromosalicylanilide (all percents are by weight). It is noted that reference in the specification or claims to the particular bromosalicylanilides and mixtures thereof is intended to include the pure compounds thereof plus the crude compounds or mixtures which contain impurities and other by-products formed during preparation.

The biocidal compositions employed according to the invention have also been utilized to great advantage in a variety of commercially available water-based paints. In each case, they have been found to impart a highly effective degree of antibacterial and antifungal properties to the paint. Thus, any type of water-based paint composition can be effectively inhibited against microbial growth according to the teachings of the invention. In such paint compositions, aqueous latex emulsions, such as polyvinyl acetate, polyacrylates, styrene butadiene, etc. are usually employed as vehicles. Water-based paint compositions such as those having the following ingredients may be employed:

| | |
|---|---|
| Latex emulsion | 100–750 parts |
| Cellulose thickener | 0.5–10 parts |
| Pigment dispersing agent | 1–25 parts |
| Defoamer | 0–10 parts |
| Pigment | 50–500 parts |
| Pigment extenders | 0–500 parts |
| Plasticiser | 0–250 parts |
| Potassium tripolyphosphate | 0–5 parts |
| Water | 25–1500 parts |

It is noted that the above formulation is based on parts by weight. It is further noted that this formulation is intended to be merely exemplary of the many known water-based paint compositions and other compositions of this type may also be used with the biocidal compositions of this invention.

The effective amount of the biocidal composition which is employed according to the invention can vary over a wide range depending on the particular medium in which it is used and the degree of growth inhibition required. Thus, any inhibitive amount may be used. Usually this ranges from about 40 to about 3,000 parts per million parts (ppm) by weight of the water-based paint composition. Preferably, an amount ranging from about 150 to about 450 ppm. is employed.

Incorporation of the biocidal compositions employed according to the invention in water-based paints can be accomplished by adding the two components separately, or as a mixture, to the particular medium and blending these components into the medium; and the term "incorporating," as used in the specification and claims herein, encompasses using any known or conventional means, such as a rolling mill or other suitable means, for blending the biocidal compositions into a water-based paint composition.

The following examples are provided to illustrate the practice of the invention. The commercial paints employed in the examples contained no biocide or preservative prior to the addition of biocide as specified.

EXAMPLES 1–11

A series of 25 gram samples of various water-based paints, as defined below, were checked for sterility by dipping a sterile Q-tip into the samples and painting on an agar plate. The agar plate was incubated for 48 hours and examined for visible signs of microbial growth. An absence of growth indicated that all the samples were sterile.

One sample of each paint was maintained as a control. Using a roller mill, into each of the other samples was blended varying concentrations of a biocide consisting of 20 percent by weight zinc 2-mercaptopyridine-1-oxide and 80 percent by weight Temasept polybrominated salicylanilide, a mixture defined previously in the specification and having 51 percent by weight of 3,4',5-tribromosalicylanilide and 45 percent by weight of 4',5-dibromosalicylanilide as the major components (See pages 4 and 5 for the complete formulation). Each of these samples were then inoculated with $1.9 \times 10^6$ organisms (0.1 ml.) representing bacteria (Flavobacterium) isolated from a sample of spoiled Voltax 31514 white acrylic latex paint and agitated to achieve a uniform dispersion. A mold (fungi-penicillium species) isolated from the same spoiled sample was used for anti-fungal testing in Examples 1–8; $1.8 \times 10^6$ fungi were added.

The samples which were kept in capped glass jars were tested weekly for sterility according to the procedure previously described and the initial inoculation was repeated weekly until failure occurred, as indicated by visible signs of microbial growth. The results are set forth in Table I below in which the plus sign (+) indicates that failure has not yet occurred at the indicated number of weeks:

TABLE I

| Example | Type of Paint | Biocide (ppm) | Failure Bacteria | (weeks) Fungi |
|---|---|---|---|---|
| Control | Benjamin Moore (Polyvinyl acetate) | 0 | 1.0 | 1.0 |
| 1 | " | 50.0 | 2.0 | 4.0 |
| 2 | " | 100.0 | 2.0 | 6.0 |
| 3 | " | 200.0 | 4.0 | 7.0 |
| Control | Valspar (Styrene butadiene 8240) | 0 | 1.0 | 3.0 |
| 4 | Valspar (Styrene butadiene 8240) | 50.0 | 1.0 | 3.0 |
| 5 | " | 100.0 | 4.0 | 4.0 |
| 6 | " | 200.0 | 6.0 | 6.0 |
| Control | Valspar (Polyvinyl Acetate 3400) | 0 | 1.0 | 3.0 |
| 7 | " | 100.0 | 3.0 | 5.0 |
| 8 | " | 200.0 | 5.0 | 6.0 |
| Control | National Lead (Acrylic) | 0 | 1.0 | |
| 9 | " | 50.0 | 3.0 | |
| 10 | " | 100.0 | 5.0 | |
| 11 | " | 200.0 | 5.0 | |

EXAMPLES 12–15

Following the procedure of the previous examples, paint samples of varying weights were admixed with the biocide described in Examples 1–11 and then inoculated weekly or biweekly, as indicated, with varying amounts of bacteria. The results are set forth in Table II below.

TABLE II

| Example | Type of Paint | Biocide (ppm) | Sample Wt.(gm) | Inoculum (No. of Bacteria) | Failure in Weeks (Weekly Inoculations) |
|---|---|---|---|---|---|
| Control | Glidden (Acrylic Latex-3600) | 0.0 | 100 | $7.2 \times 10^6$ | 2.0 |
| 12 | " | 150.0 | 25 | $1.8 \times 10^6$ | 4.0 |
| 13 | " | 150.0 | 100 | $7.2 \times 10^6$ | 4.0 Bi-Weekly Inoculations |
| Control | Pittsburgh (Polyvinyl Acetate) | 0.0 | 100 | $9.0 \times 10^3$ | 2.5 |
| 14 | Pittsburgh (Polyvinyl Acetate) | 200.0 | 100 | $9.0 \times 10^3$ | 7.0 |

TABLE II – Continued

| Example | Type of Paint | Biocide (ppm) | Sample Wt.(gm) | Inoculum (No. of Bacteria) | Failure in Weeks (Weekly Inoculations) |
|---|---|---|---|---|---|
| Control | " | 0.0 | 100 | $9.0 \times 10^3$ | 0.5 |
| 15 | " | 200.0 | 100 | $9.0 \times 10^3$ | 7.0 |

EXAMPLE 16

A series of 25-gram samples of an acrylic latex paint as defined below were admixed with 250 ppm. of varying mixtures of zinc 2-mercaptopyridine-1-oxide (ZnMPO) and Temasept (PBS) as defined earlier.

| Acrylic Latex Paint | |
|---|---|
| Rhoplex AC-490 | 590.5 parts (by weight) |
| Rutile T₁O₂ | 275.0 parts |
| propylene glycol | 152.5 parts |
| Tamol 731 | 11.0 parts |
| Nopco NDW | 6.0 parts |
| Butyl cellosolve | 27.5 parts |
| Triton GR-7 | 2.0 parts |
| Natrosol 250 HR(2.5% soln.) | 42.4 parts |
| water | 62.4 parts |

The samples were then placed in sterile glass jars and inoculated with a bacterial mixture to a concentration of $120 \times 10^3$ organisms per sample. The organism mixture was composed of equal parts of gram negative bacteria isolated from a contaminated latex plus a Flavobacterium and Serratia species. Following inoculation the samples were incubated at 30°C.

At 1-day intervals following inoculation, the samples were streaked with a sterile swab onto a nutrient agar plate (Trypticase Soy Agar), incubated and checked for growth or no-growth. The earliest time of no-growth was noted for each sample and is referred to as the kill time. Results for the various samples are found in the attached table.

TABLE III

| Biocide Ratio* (ZnMPO:PBS) | Concentration (ppm) ZnMPO | PBS | Kill Time (HRS) |
|---|---|---|---|
| 1:1 | 125 | 125 | 24 |
| 1:2 | 83.3 | 166.7 | 24 |
| 1:4 | 50 | 200 | 48 |
| 1:8 | 27.8 | 222.2 | 48 |

*ZnMPO represents zinc 2-mercaptopyridine-1-oxide. PBS represents Temasept as defined on pages 4 and 5.

EXAMPLE 17

A series of 25-gram samples of a polyvinyl acetate latex paint was prepared and tested using the same procedure followed in Example 16. The paint used had the following formulation.

| Polyvinyl Acetate Latex (Airco 72011) | | |
|---|---|---|
| Natrosol 250 HR (2% solution) | 235 | parts (by wt.) |
| Tamol 731 | 7 | parts |
| Potassium Tripolyphosphate | 0.5 | parts |
| Igepal CO-610 | 3 | parts |
| Ethylene glycol | 25 | parts |
| Drew L-475 | 4 | parts |
| Texanol | 10 | parts |
| PMA-18 | 0.3 | parts |
| Ti-Pure R-901 | 250 | parts |
| Satintone No. 1 | 75 | parts |
| Snowflake | 75 | parts |
| Gold Bond R | 50 | parts |

| Polyvinyl Acetate Latex (Airco 72011) | | |
|---|---|---|
| Water | | 175 parts |
| Airflex 720 | — | 265 parts |

The results for the various samples are found in the attached table.

TABLE IV

| Biocide Ratio* (ZnMPO:PBS) | Concentration (ppm) ZnMPO | PBS | Kill Time (Hrs.) |
|---|---|---|---|
| 1:1 | 125 | 125 | 24 |
| 1:2 | 83.3 | 166.7 | 24 |
| 1:4 | 50 | 200 | 24 |
| 1:8 | 27.8 | 222.2 | 48 |

*ZnMPO represents zinc 2-mercaptopyridine-1-oxide. PBS represents Temasept as defined on pages 4 and 5.

COMPARATIVE EXAMPLE 1

For purposes of comparison, a series of starch pastes consisting of 10 percent corn starch dispersed in water was exposed for 7 days to air inoculation and then inoculated with 0.1 ml. of mixed organisms obtained from a spoiled starch sample. Each sample was then admixed with a certain biocide, as indicated in Table V below, and the glass jars capped. The samples were tested daily until failure, as indicated by visible signs of microbial contamination. As shown in the table, the binary biocide employed in this invention not only was a poor preservative for the starch paste, but exhibited a type of negative effect in this particular aqueous medium. In the table, "ZnMPO" refers to zinc 2-mercaptopyridine-1-oxide; the composition of PBS (Temasept) is set forth in the other examples and on pages 4 and 5.

TABLE V

| Biocide | Conc. (ppm) | Days to Failure From Inoculation |
|---|---|---|
| Control | — | 7 |
| ZnMPO | 40 | 28 |
| PBS | 160 | 7 |
| 20% by wt. ZnMPO and 80% by wt. PBS | 200 | 13 |

What is claimed is:

1. In a process for inhibiting the growth of bacteria and fungi in a water-based paint composition the improvement consisting essentially of incorporating in said paint composition an inhibitive amount of a biocidal composition comprising a mixture of a metal salt of 2-mercaptopyridine-1-oxide selected from the group consisting of zinc, zirconium and tin salts and a bromosalicylanilide selected from the group consisting of 3,4',5-tribromosalicylanilide, 4',5-dibromosalicylanilide and mixtures thereof in amounts of from about 1:1 to about 1:8 parts by weight of said 2-mercaptopyridine-1-oxide salt to said bromosalicylanilide.

2. The process of claim 1 wherein said inhibitive amount ranges from about 40 to about 3,000 parts per million by weight.

3. The process of claim 2 wherein said 2-mercaptopyridine-1-oxide metal salt is the zinc salt.

4. The process of claim 1 wherein from about 1:2 to about 1:4 parts by weight of said 2-mercaptopyridine-1-oxide salt to said bromosalicylanilide are used.

5. The process for claim 4 wherein said 2-mercaptopyridine-1-oxide metal salt is the zinc salt.

6. The process of claim 5 wherein said inhibitive amount ranges from about 40 to about 3,000 parts per million by weight.

7. The process of claim 4 wherein said inhibitive amount ranges from about 150 to about 450 parts per million by weight.

* * * * *